US009631536B2

(12) United States Patent
Dementhon et al.

(10) Patent No.: US 9,631,536 B2
(45) Date of Patent: Apr. 25, 2017

(54) SYSTEM FOR STORING AND DELIVERING GASEOUS AMMONIA

(71) Applicant: AAQIUS & AAQIUS SA, Geneva (CH)

(72) Inventors: Jean-Baptiste Dementhon, Paris (FR); Michael Francis Levy, Paris (FR)

(73) Assignee: AAQIUS & AAQIUS SA, Geneva (CH)

( * ) Notice: Subject to any disclaimer, the term of this patent is extended or adjusted under 35 U.S.C. 154(b) by 0 days.

(21) Appl. No.: 14/419,648

(22) PCT Filed: Aug. 9, 2013

(86) PCT No.: PCT/EP2013/066767
§ 371 (c)(1),
(2) Date: Feb. 4, 2015

(87) PCT Pub. No.: WO2014/023839
PCT Pub. Date: Feb. 13, 2014

(65) Prior Publication Data
US 2015/0176460 A1    Jun. 25, 2015

(30) Foreign Application Priority Data

Aug. 9, 2012 (EP) ..................................... 12305991

(51) Int. Cl.
*C01C 1/00* (2006.01)
*F17C 11/00* (2006.01)
*F01N 3/20* (2006.01)

(52) U.S. Cl.
CPC ............ *F01N 3/2066* (2013.01); *C01C 1/006* (2013.01); *F01N 3/206* (2013.01); *F17C 11/00* (2013.01);
(Continued)

(58) Field of Classification Search
CPC .......... F17C 11/00; C01C 1/006; F01N 3/206; F01N 3/2066; F01N 2610/02;
(Continued)

(56) References Cited

U.S. PATENT DOCUMENTS 4,446,111 A * 5/1984 Halene .................. C01B 3/0005
206/0.7
6,638,348 B2 * 10/2003 Kuriiwa ................. B01D 53/02
206/0.7
(Continued)

FOREIGN PATENT DOCUMENTS

CN     201755417     3/2011
EP     2 181 963 A1  5/2010
(Continued)

*Primary Examiner* — Frank Lawrence
(74) *Attorney, Agent, or Firm* — Blakely Sokoloff Taylor & Zafman LLP

(57) ABSTRACT

A system for storing and delivering gaseous ammonia to a consumer unit (30) including: a plurality of gaseous ammonia storage cells (10) each including: a storage material (102) that is a gaseous ammonia absorber, a pressure adjuster for adjusting an internal pressure of each cell independently of the other cells of the plurality, including a heater (106), an outlet interface (40) connecting the plurality of cells (10) to the consumer unit (30) allowing gaseous ammonia to leave the cell (10) when the internal pressure is higher than a pressure downstream, a control device (50) common to the plurality of cells (10) allowing control, independently of the other cells of the plurality, of the activity of each cell (10) in delivering ammonia to the outlet interface (40) using a controller (502) which controls the heater (106) for the pressure adjuster (10).

39 Claims, 5 Drawing Sheets

(52) U.S. Cl.
CPC ...... *F01N 2610/02* (2013.01); *F01N 2610/06* (2013.01); *F01N 2610/10* (2013.01); *F01N 2610/142* (2013.01); *F01N 2610/1406* (2013.01); *F01N 2610/1413* (2013.01); *F01N 2900/1808* (2013.01); *Y02T 10/24* (2013.01); *Y10T 137/0396* (2015.04); *Y10T 137/4857* (2015.04)

(58) Field of Classification Search
CPC ............ F01N 2610/06; F01N 2610/10; F01N 2610/1406; F01N 2610/1413; F01N 2610/142; F01N 2900/1808; Y02T 10/24; Y10T 137/0396; Y10T 137/4857
USPC ................ 95/128; 96/146; 206/0.7; 423/352
See application file for complete search history.

(56) References Cited

U.S. PATENT DOCUMENTS

| | | | | |
|---|---|---|---|---|
| 8,449,857 | B2* | 5/2013 | Johannessen | B01D 53/0454 206/0.7 |
| 8,834,603 | B2* | 9/2014 | Johannessen | C01C 1/006 206/0.7 |
| 9,322,695 | B2* | 4/2016 | Nicholls | G01F 23/0061 |
| 2010/0086467 | A1* | 4/2010 | Johansen | C01C 1/006 423/352 |
| 2010/0293927 | A1* | 11/2010 | Johannessen | B01D 53/79 60/295 |

FOREIGN PATENT DOCUMENTS

| | | |
|---|---|---|
| EP | 2 386 523 A1 | 11/2011 |
| EP | 2 441 933 A1 | 4/2012 |

* cited by examiner

SYSTEM FOR STORING AND DELIVERING GASEOUS AMMONIA

FIELD OF THE INVENTION

The invention relates, generally speaking, to the storage of ammonia in applications of reduction of nitrogen oxides NOx by selective catalytic reduction (SCR), especially for the reduction of emissions of pollutants by heat engines, in particular diesel engines.

STATE OF THE ART

In the search for less polluting solutions in the automobile sector, the storage of gas is seeing more and more potential applications. To push back the two traditional limits of gas storage, namely density and safety, solid gas absorbing materials are the subject of particular interest. Having available simple, efficient, easy to produce solutions for the storage of gas by these absorbent materials is an important issue in the medium term for the automobile industry. The document US2001/0053342 thus describes the principle of a chemical storage of ammonia gas and its use for the pollution control of NOx by SCR post-treatment.

A storage system for gas absorbing material must obey specific technical constraints. It must firstly have a high autonomy, which is reflected in an internal volume available for the material that is as high as possible. However, the system must have an overall compactness sufficient to enable easy integration into the vehicle. The production of a tank of large dimensions, capable of withstanding high pressure, typically higher than 8 bars, poses problems of design, integration and maintenance. For example, it is difficult to produce storage tanks with non-cylindrical shapes. These constraints mean that existing storage systems are bulky and heavy.

With reference to FIG. 1, a heat engine equipped with a SCR post-treatment system by injection of ammonia according to the prior art is schematically represented.

An engine 901 is managed by an electronic control unit 911. At the outlet of the engine, the exhaust gases 912 are directed towards a pollution control system 902. The pollution control system 902 may include an oxidation catalyst or a three-way catalyst. The pollution control system may further include a particle filter.

Ammonia 916 is injected at the level of an exhaust circuit 30 of the engine and mixed with the exhaust gases using an injection module 903 arranged for example downstream of the pollution control element 902 to form an ammonia/exhaust gas mixture 913. The ammonia/exhaust gas mixture 913 then passes through a SCR catalyst 904 which allows the reduction of NOx by ammonia. Complementary post-treatment elements 905 may be positioned after the SCR catalyst 904. The complementary elements 905 may include a particle filter or an oxidation catalyst. The exhaust gases are thus in the form of cleaned up exhaust gases 914 at the outlet of the complementary elements 905. The cleaned up exhaust gases are then directed towards an exhaust outlet 917. Thus the exhaust 30 includes, arranged from upstream, on the engine side 901, to downstream, on the output side 917, the pollution control element 902, the injection module 903, the SCR catalyst 904, and the complementary elements 905.

To assure a supply and a dosage of ammonia 916 at the inlet of the injection module 903, the system includes an ammonia storage enclosure 112 according to the prior art containing a storage material 102 being able to be temperature managed by a heating means 106. The heating means 106 includes for example an electrical resistance or a heat exchanger supplied by a heat transfer fluid such as the engine coolant.

The storage enclosure 112 is connected to a device 906 for controlling the pressure of the enclosure and the dosage of ammonia towards the injection module 903. This device 906 may be managed by a dedicated electronic controller 910 connected to the electronic control unit 911 of the engine.

The system thus includes an ammonia supply circuit including, from upstream to downstream in the direction of flow of ammonia, the storage enclosure 102, the device 906, and the injection module 903 in the exhaust 30.

In an alternative configuration, not represented, the device 906 may be directly managed by the engine control unit 911.

A drawback of such a solution is that a single tank of large dimensions is difficult to manage in practice. On the one hand, such a tank is difficult to manage in utilisation phase on a vehicle on the move, that is to say in gas desorption phase, because such a tank does not make it possible to assure a rapid response time while maintaining a precision and a dynamic of the pressure control. Furthermore, such a tank requires a high energy need to assure the desorption of gas. On the other hand, a single tank of large dimensions is difficult to manage in its recharge phase, that is to say in its absorption phase, with especially absorption times that are necessarily very long.

The production of such a gas storage system adapted to the automobile must thus take into account a large number of constraints among which are included the thermal management of the material, the volume compactness of the system, its mass, its manageability, its production cost, or instead its ergonomics during a step of maintenance by the client or the dealer.

Thus, it has already been envisaged to resort to several tanks, which then become sub-systems of the storage system. By this means it is sought to enhance the performance of the storage system by improving the thermal management of the storage material, the integration of the system thanks to storage sub-systems of small size which simplify integration on the vehicle, or instead the ergonomics of the maintenance step by the dismantling of several small and light sub-systems.

NH3 gas storage systems partitioned into several cells exist to make it possible to limit heating to part only of the storage material. Such multi-cell storage systems have however a high production cost due to the number of cells and associated equipment. Furthermore for such multi-cell systems, the controls, such as the delivery of ammonia, the management of the pressure, or the management of the quantity of ammonia remaining in each cell are complex to put in place.

Such multi-cell systems also pose problems of compactness. This is because they require a large number of cells of low capacity, thus a greater volume of material in total, more components for the management and more components for the integration of the system on a vehicle such as fixations, hooks or heat shields.

SUMMARY OF THE INVENTION

An aim of the invention is to provide a system making it possible to offset these drawbacks. In particular, an aim of the invention is to assure an optimised management of the storage of gas in a multiple cell system.

To this end, a system for storing and delivering gaseous ammonia to a consumer unit is provided, the system including:
- a plurality of cells for storing gaseous ammonia, each including:
  - a storage material that is a gaseous ammonia absorber,
  - a means for adjusting an internal pressure of each cell independently of the other cells of the plurality, including a heating means (106), the system further including:
- an outlet interface connecting the plurality of cells to the consumer unit, allowing gaseous ammonia to leave the cell when the internal pressure is higher than a downstream pressure,
- a control device common to the plurality of cells, allowing control, independently of the other cells of the plurality, of the activity of each cell in delivering ammonia to the outlet interface using means for controlling the means for adjusting an internal pressure of the plurality of cells.

The invention is advantageously completed by the following characteristics, taken alone or in any of the technically possible combinations thereof:
- the outlet interface includes for each cell an outlet valve allowing gaseous ammonia to leave the cell when the internal pressure is higher than a downstream pressure of the outlet valve;
- the system includes a means for regulating the flow of gaseous ammonia towards the consumer unit, the outlet interface connecting the plurality of cells to the means for regulating the flow, and
- the outlet interface includes a common channel, downstream of the outlet valves, connecting the outlet valves of the plurality of cells and the means for regulating the flow, such that the opening of an outlet valve causes the closure of the other outlet valves by pressure difference,
- the control device includes means for controlling the means for regulating the flow,
- the control device includes a pressure sensor in the outlet interface,
- the common control system is able to estimate for each cell an internal pressure as a function of the control of the means for adjusting the pressure of the cell and of a measurement of a parameter chosen from a group including state variables of the cell and the pressure measured by the pressure sensor of the outlet interface,
- the means for regulating the flow is an electrovalve,
- at least one means for adjusting an internal pressure includes a cooling means,
- the storage material of at least one cell is spread out in a plurality of compartments communicating freely between each other,
- the storage material includes a powdered salt of an alkaline-earth metal chloride,
- the system includes a common inlet interface including a common inlet channel connecting the plurality of cells, the common channel being able to be connected to a filling means for filling in parallel the cells during a filling operation,
- the system includes, for each cell, an inlet interface able to be connected to a filling means for filling the cell independently of the other cells, the inlet interface being distinct from the outlet interface,
- the inlet interface or the plurality of inlet interfaces includes a passive non-return inlet valve allowing the input of gaseous ammonia into the plurality of cells or one of the plurality of cells when the internal pressure is lower than an upstream pressure of the inlet valve,
- the outlet interface is an inlet interface able to be connected to a filling means for filling the cell independently of the other cells,
- each cell can be dismantled independently of the other cells to undergo a filling operation,
- the cells are arranged in groups, the groups being controlled independently of each other,
- the system includes at least one rail for collecting ammonia with which the cells of a group are made integral,
- the rail and the integrated cells are fixed in a removable manner to the system, so that the rail and the plurality of integrated cells can be dismantled together,
- the rail includes a common inlet interface including a common inlet channel connecting the integrated cells, the common channel being able to be connected to a filling means for filling in parallel the cells during a filling operation,
- the rail includes a cavity adapted to receive a heat transfer fluid.

The invention also relates to a method for delivering gaseous ammonia to a consumer unit by a system for storing and delivering gaseous ammonia, the system including;
- a plurality of gaseous ammonia storage cells, each including:
  - a storage material that is a gaseous ammonia absorber,
  - a means for adjusting an internal pressure of each cell independently of the other cells of the plurality, including a heating means, the method including the steps consisting in;
- determining a given cell among the plurality of storage cells,
- controlling the means for adjusting the internal pressure of the plurality of cells, the step including the increase of an internal pressure of the given cell independently of the other cells, to allow gaseous ammonia to leave the cell when the internal pressure is higher than a downstream pressure,
- delivering gaseous ammonia from the given cell to the consumer unit independently of the other cells of the plurality via an outlet interface connecting the plurality of cells to the consumer unit.

The invention is advantageously completed by the following characteristics, taken alone or in any technically possible combinations thereof:
- the system includes, for each cell an outlet valve allowing gaseous ammonia to leave the cell when the internal pressure is higher than a downstream pressure of the outlet valve, and a means for regulating the flow of gaseous ammonia towards the consumer unit, the step of delivery including the sub-steps consisting in:
  - transmitting gaseous ammonia from the given cell to a common channel, downstream of the outlet valves, connecting the outlet valves of the plurality of cells and the means for regulating the flow, by causing the opening of the outlet valve of the given cell by pressure difference between the given cell and the common channel,
  - causing the closure of the outlet valves of the other cells by pressure difference between the common channel and the other cells,
  - opening the means for regulating to deliver to the consumer unit the gaseous ammonia transmitted to the common channel,
- the method further includes the steps consisting in:

carrying out an estimation of an internal pressure of each cell as a function of the control of means for adjusting the pressure of the cell, detecting the overrun of a threshold value by the internal pressure of the given cell corresponding to an opening of the outlet valve of the given cell, after detection of the overrun, carrying out for the given cell an estimation of an internal pressure as a function of the pressure measured at the level of the common channel, carrying out a gauging by means for gauging the quantity of gaseous ammonia stored by each cell as a function of the variations of the measured pressure, the method includes the steps consisting in:

calculating for each cell a coefficient of interest as a function of a quantity of ammonia gauged by gauging means, of characteristics of the storage material, of a state variable of the cell and of a state variable of the exterior environment, comparing the coefficients of interest to determine the given cell, the calculation of the coefficient is carried out as a function of a history of the utilisations of the cell, so as to take into account a higher temperature than the other cells on account of a recent utilisation, and/or so as to obtain a homogeneous utilisation rate of the cells for a given period, a cell is conserved full until all of the other cells have a fill rate lower than a given value, the cells are arranged in groups, the groups being controlled independently of each other.

BRIEF DESCRIPTION OF THE FIGURES

Other characteristics, aims and advantages of the invention will become clear during the description hereafter of an embodiment. In the appended drawings.

DETAILED DESCRIPTION OF THE INVENTION

1. Different Embodiments of the System a. First Embodiment

Figure 1:
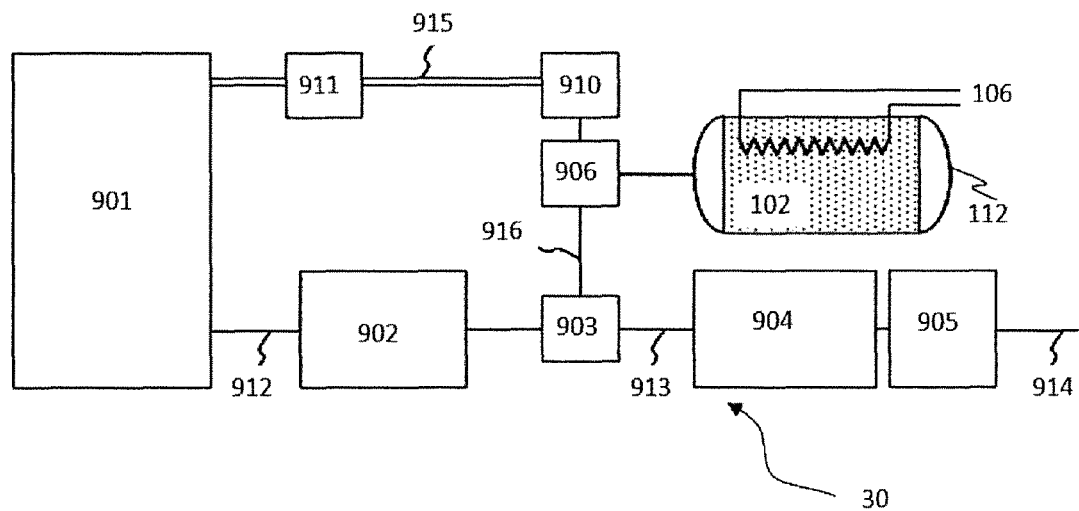
FIG. 1 represents a heat engine equipped with a SCR post-treatment system by injection of ammonia.
Figure 2A:
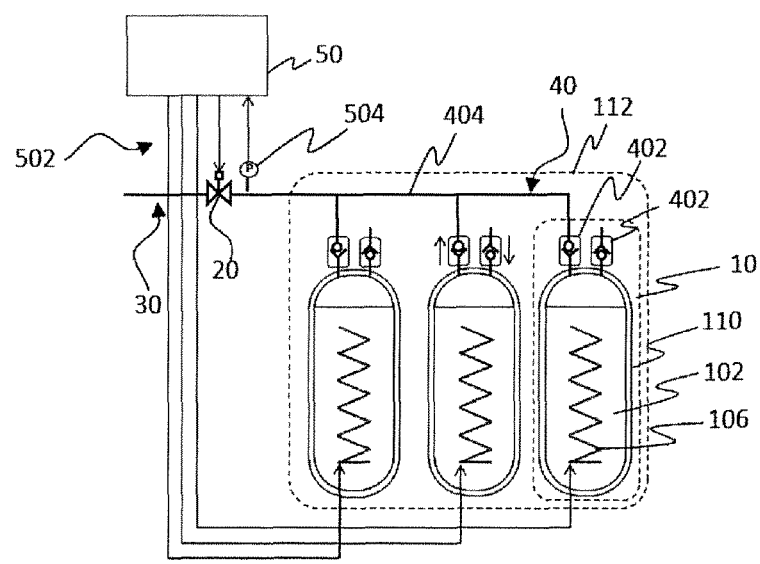
FIG. 2a represents an example of storage system according to a first embodiment of the invention in a utilisation phase on a vehicle.
Figure 2B:
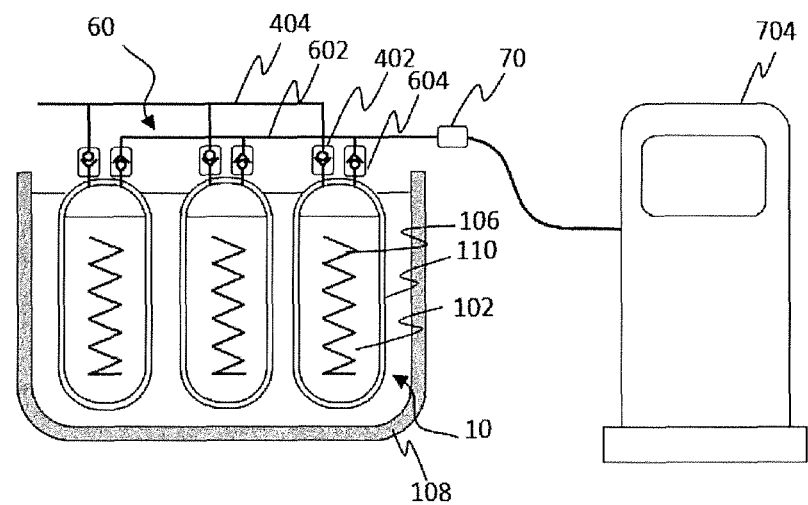
FIG. 2b represents the system of FIG. 2a in a filling phase.

With reference to FIGS. 2a and 2b, a system for storing and delivering gaseous ammonia to a consumer unit 30 according to a first embodiment of the invention is described.

The system includes a plurality of cells 10 for storing gaseous ammonia. Each storage cell 10 includes an enclosure 110 in which is found a storage material 102 that is a gaseous ammonia absorber. The storage material 102 is a solid material. The storage material 102 may be a powdered salt of an alkaline-earth metal chloride. The storage material 102 may further include an additive forming with the salt a composite material and making it possible to improve the thermal conductivity and the mechanical robustness of the material. The additive includes for example metals, carbon fibre, expanded graphite.

Each storage cell 10 further includes a means for modifying an internal pressure independently of the other cells.

The means for modifying the internal pressure includes a heating means 106. The heating means 106 is for example a resistance. The means for modifying the internal pressure may include a cooling means 108. The cooling means 108 may be a cooling device common to the whole of the system or to a particular cell 10. The cooling means 108 includes for example a circuit for circulating a cooling fluid, for example an aqueous fluid, for example water.

The storage material 102 of at least one cell 10 may be spread out in a plurality of compartments communicant freely between each other. Each compartment 110 of a same cell 10 contains the same material and is managed by the same means for modifying the internal pressure.

The storage material 102 and the performances of each cell 10 may be identical to all of the cells 10 or different from one cell 10 to the next. The performances include for example the vapour pressure that may be obtained in the cell 10, the conductivity of the storage material 102 and the heat capacity of the storage material 102. Similarly, the cells 10 may be identical or different in terms of volume, geometric shape, type and performance of the heating device, or thermal insulant of the enclosure 110.

The system includes a means 20 of regulating the flow of gaseous ammonia towards the consumer unit 30. The means for regulating the flow 20 is for example a valve, preferentially an electrovalve.

The system further includes an outlet interface 40 connecting the plurality of cells 10 to the means for regulating the flow 20. The outlet interface 40 enables the passage of the gas from the inside to the outside of the cell. The outlet interface 40 is thus used during the utilisation of the storage system to supply with gas, for example with ammonia, the remainder of the system, that is to say during the ammonia desorption phase.

For each cell 10, the outlet interface 40 includes a passive non-return outlet valve 402 allowing gaseous ammonia to leave the cell 10 when the internal pressure is higher than a downstream pressure of the outlet valve 402. The outlet valve 402 may be a mechanical device, for example a ball valve. The outlet valve 402 is simple to implement, not very bulky and inexpensive. It is passive and thus does not require management by the control unit.

The outlet interface 40 also includes a common channel 404, downstream of the outlet valves 402. The outlet interface 40 connects the outlet valves 402 of the plurality of cells 10 and the means for regulating the flow 20, such that the opening of an outlet valve 402 causes the closure of the other outlet valves 402 by pressure difference.

The system further includes a control device 50 common to the plurality of cells 10, including means 502 of controlling the means for regulating the flow 20. The control means 502 also control the means for modifying the internal pressure 106 of the plurality of cells 10. The control of these elements by the control means 502 make it possible to control independently each cell 10, in particular each cell of the plurality.

The common control device 50 may also include a pressure sensor 504 of the outlet interface 40. The pressure sensor 504 is for example included in a dosage module including the means for regulating the flow 20. The pressure sensor may be arranged at the level of the common channel 404, upstream of the means for regulating the flow 20. In these conditions, the pressure measured by the pressure sensor 504 of the dosage module is the pressure that reigns in this common channel 404.

The common control device 50 carries out for each cell 10 an estimation of an internal pressure as a function of the control of the means for modifying the pressure 104 of the cell 10 and of a measurement of a state variable of the cell 10 and/or of the pressure measured by the pressure sensor 504 of the outlet interface 40.

The control device 50 includes means for gauging the quantity of gas in each cell 10. The behaviour of the control device 50 vis-à-vis the cells 10 depends on the specific characteristics of the cells 10. If the definition of the cells 10 is different, a calibration specific to each cell 10 is implemented. Thus, each cell 10, in particular each cell of the plurality, may be managed independently, and each cell is identified in the control unit and has available specific pressure control and gauging means.

The control device 50 may include supervision means in charge of the management of the cells 10 of the storage system, which manages the supply of the heating means 106 of each cell 10.

The supervision means make it possible to determine the cell 10 the most adapted to be used. Such a determination may depend on the state of charging and on the definition of the cells 10. Typically, it could be interesting to switch over onto a cell 10 which requires a lot of energy when there is energy easily available on board the vehicle, for example in the event of circulation in extra-urban environment. On the contrary, when little energy is available on board the vehicle, for example in the case of a start-up in cold climate, preferably a cell could be used that releases the gas at lower energy cost, at least for the start-up. It may be for example a cell containing a highly conductive, high vapour pressure salt.

In the proposed invention, the supervisor determines, by calculation at each instant and for each cell, an alpha coefficient representing the interest of switching over the heating and the consumption of ammonia onto this cell. This coefficient is calculated at each instant and for each cell as a function of the charge rate, of its definition, of the present conditions of use. At start-up, the cell having the highest coefficient becomes the target cell that is heat managed. The change from one cell to the other may be decided during use, when the coefficient of a cell is higher than that of the cell currently under pressure management.

The system may include an inlet interface allowing the passage of gas from the outside to the inside of the cell(s) 10. This inlet interface is used during the phase of filling with gas, for example with ammonia, of the storage material contained in the cell 10.

The first embodiment includes a common inlet interface 60 including a common inlet channel 602 connecting the plurality of cells 10, the common channel 602 being able to be connected to a filling means 70 for filling in parallel the cells 10 during a filling operation. The filling means 70 may be a static device, outside of the vehicle, containing the gas for the filling and means for managing the temperature and pressure of this gas. The filling means 70 includes for example a pump-tank assembly 704.

In filling configuration, the assembly of cells 10 is then subjected to the same temperature and pressure conditions, managed by the filling means 70. The interest of this configuration is to have a single inlet interface 602 for the whole of the storage system. Such a configuration enables a limitation of the manufacturing cost of the storage system and simplifies the integration of the storage system on a vehicle.

The inlet interface 60 may include a passive non-return inlet valve 604 allowing the input of gas into the cells 10 when the internal pressure is lower than an upstream pressure of the inlet valve 604.

b. Second Embodiment

Figure 3:
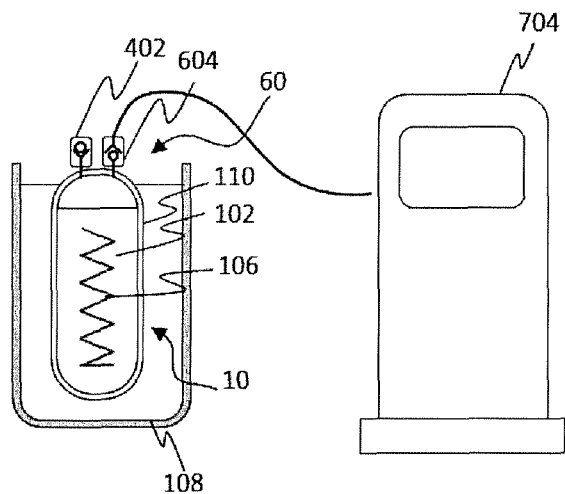
FIG. 3 represents an example of storage system according to a second embodiment of the invention in a filling phase.

According to a second embodiment of the invention, illustrated in FIG. 3, the storage system on a vehicle includes, for each cell 10, an inlet interface able to be connected to a filling means 70 for filling the cell 10 independently of the other cells, in particular of the other cells of the plurality, the inlet interface 60 being distinct from the outlet interface 40.

The inlet interfaces 60 of each cell 10 are independent of each other. During a maintenance operation, each cell 10 is connected by its inlet interface 60 to the gas filling device. The interest of this configuration is to allow a dismantling and a filling of part of the storage sub-system uniquely; it is possible to maintain on the vehicle the cells 10 not discharged of gas and to dismantle the vehicle in order to carry out the filling operation uniquely on the cells 10 discharged of gas.

The inlet interfaces 60 may each include a passive non-return inlet valve 604 allowing the input of gas into each of the plurality of cells 10 when the internal pressure is lower than an upstream pressure of the inlet valve 604.

c. Third Embodiment

Figure 4:
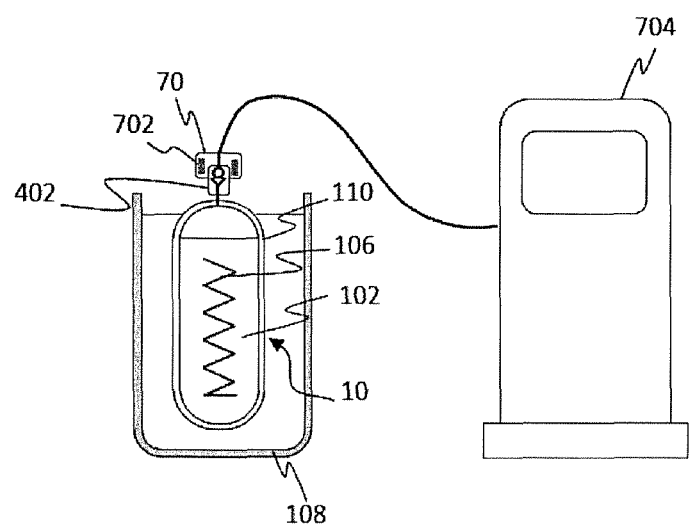
FIG. 4 represents an example of storage system according to a third embodiment of the invention in a filling phase.

According to a third embodiment, illustrated in FIG. 4, the outlet interface 40 also plays the role of an inlet interface able to be connected to a filling means 70 for filling the cell 10 independently of the other cells, in particular of the other cells of the plurality. Each outlet valve 402 is able to be attracted by a magnetic device 702 to allow the input of gas into the cell 10 when the internal pressure is lower than a downstream pressure of the outlet valve 402.

Thus the filling operation is carried out using a specific interface 702 making it possible to attract the non-return outlet valve 402 by authorising the passage of gas from the outside to the inside when the external pressure is higher than an internal pressure at the cell. The specific interface is for example a magnetic device which "lifts" a ball for blocking the outlet valve 402 by magnetization, whereas this normally mechanically blocks an outlet duct by pressure effect.

Each cell 10 can be dismantled independently of the other cells of the plurality 10 to undergo a filling operation.

d. Fourth Embodiment

A system is described for storing and delivering gaseous ammonia to a consumer unit 30 according to a fourth embodiment of the invention (not represented).

The system may be organised in a manner similar to the first, second and/or third embodiments of the invention.

Moreover, the cells are arranged in groups, the groups being controlled independently of each other.

In particular, at least part of the cells 10 may be united together to form at least one assembly or pack of cells.

The cells of a pack are for example attached together, for example in an integral manner, to form an integral assembly.

The cells are for example made integral at the level of a common structure, typically a common rail for collecting ammonia or a plurality of rails for collecting ammonia.

Rail is taken to mean a structure with which the cells of an assembly are made integral, and which may be inserted into a dedicated zone of a vehicle, for example to be fixed thereon in a removable manner.

When a pack of cells is installed on a vehicle, it is typically connected thereto via an outlet interface 40 as described previously. This outlet interface 40 is for example an outlet interface common to the cells, as described previously. The common outlet interface thus constitutes an additional means for making integral the cells of the assembly.

The cells include a means for modifying an internal pressure independently of the other cells, in particular of the other cells of the plurality, including a heating means 106, as described previously.

The rail for collecting ammonia includes for example a dedicated thermal input, and optionally thermal extraction, means. It may be for example an electrical resistance specific to the rail or a double skin making it possible to receive and/or circulate a heat transfer fluid. Double skin is taken to mean a structure including two distinct layers between which a heat transfer fluid may be inserted and/or placed in circulation.

This means makes it possible to control the temperature of the rail, and for example to adjust it to an intermediate temperature between the temperature of the cell and the temperature at the outlet of the engine of the vehicle, for example at the level of an exhaust of the vehicle.

The rail and the integrated cells 10 are for example fixed in a removable manner to the storage system, so that the rail and the plurality of integrated cells can be dismantled together.

Each assembly of cells can thus be dismantled from the remainder of the storage and delivery system of the vehicle, at least when the assembly is emptied of its ammonia. The rail may for example be dismantled to remove the assembly of cells from the vehicle. It is thus possible to replace the empty assembly by a full assembly, and/or refill the cells of the assembly with ammonia.

The assemblies of cells may be adapted to be filled on the spot, for example in a dealership, or may have a security preventing their filling without a specific opening or unlocking key. The assemblies may then be transferred to a dedicated centre where they will be filled.

The rail may include a common inlet interface including a common inlet channel connecting the integrated cells 10, the common channel being able to be connected to a filling means for filling in parallel the cells during a filling operation.

As illustrated by the third embodiment, the common outlet interface 40 may be used as inlet interface.

Moreover, the rail may include a cavity adapted to receive a heat transfer fluid.

For example, a rail including a double skin may be used to make a heat transfer fluid circulate in the double skin, making it possible to cool the cells during their recharge. This cooling makes it possible to offset the risks associated with heating of the cells during their recharge, the absorption of ammonia within the storage material being an exothermic phenomenon.

2. Different Aspects of the Method a. Method of Delivery

Figure 5:
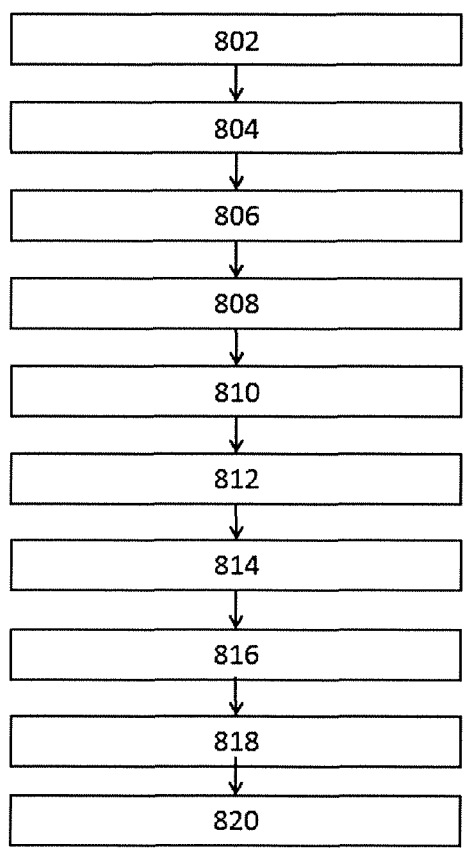
FIG. 5 illustrates schematically an example of method according to an embodiment of the invention.

With reference to FIG. 5, a method for delivering gas, for example gaseous ammonia, to a consumer unit 30, by a storage system as described above is described.

The method may include a first step 802 consisting in carrying out an estimation of an internal pressure of each cell 10 as a function of the control of the means for modifying the pressure 104 of the cell. The estimation may moreover result from a measurement of a state variable of the cell 10 or its environment, for example the ambient temperature.

The method includes a second step 804 consisting in increasing an internal pressure of a given cell 10 independently of the other cells, in particular of the other cells of the plurality. This step may include the heating of the given cell 10 by the dedicated heating means 106. The step 804 may be carried out simultaneously, before or after the first estimation step 802.

Thus the control device 50, for example a control unit, estimates by calculation the pressure reigning within the cell 10. The increase in theoretical pressure may be calculated as a function of the energy supplied by the heating means 106 and the initial ambient temperature, which constitutes a state variable.

Such a pressure estimation is described in the document US 2010/0021780.

The method includes a third step 806 consisting in transmitting gaseous ammonia from the given cell 10 to the common channel 404 by causing the opening of the outlet valve 402 of the given cell 10 by pressure difference between the given cell 10 and the common channel 404.

The method includes a fourth step 808 consisting in detecting the overrun of a threshold value by an internal pressure of the given cell 10 corresponding to an opening of the outlet valve 402 of the given cell 10.

The method includes a fifth step 810 consisting in carrying out, after detection of the overrun, for the given cell 10 an estimation of an internal pressure as a function of a pressure measured at the level of the common channel 404.

The method includes a sixth step 812 consisting in causing the closure of the outlet valves 402 of the other cells by pressure difference or pressure effect between the common channel 404 and the other cells. It is thus possible to manage each cell 10 in an independent manner using heating means 106 specific to each cell 10. The pressure that reigns in the common channel 404 and as measured by the pressure sensor 504 is the pressure of the heat supplied cell 10.

For example, an increase in calculated pressure is compared to a pressure threshold of the outlet valve 402. When this increase in calculated pressure exceeds a pressure delta corresponding to the pressure threshold by a factor included between 1.3 and 3 bars, the control device 50 establishes that the pressure generated within the cell 10 being heated is sufficiently high to open the outlet valve 106 of the cell 10, and imposing, by pressure effect, the closure of the outlet valves of the other cells not supplied with heat. The control device 50 then establishes that the pressure reigning in the common channel 404 and as measured by the pressure sensor 504 is the pressure reigning in the cell 10 being heated. The control device 50 may then activate the various pressure control or gauging algorithms on the cell in question.

Thus, each cell 10 may be managed independently, in particular independently of the other cells of the plurality, by a same dosage module including the pressure sensor 504 and the means for regulating the flow 20, by managing the activation of the heating means 106, and without having to manage by the control device 50 the opening or the closure of the cell 10 by a dedicated valve as proposed in the prior art.

The method includes a seventh step 814 consisting in opening the means for regulating 20 for delivering to the consumer unit 30 the gaseous ammonia transmitted to the common channel 404.

The method includes an eighth step 816 consisting in carrying out a gauging of the quantity of gaseous ammonia stored by each cell 10 as a function of the variations in the measured pressure.

According to a particular embodiment, the cells are arranged in groups, the groups being controlled independently of each other.

b. Determination of the Target Cell

The method includes a ninth step 818 consisting in calculating 818 for each cell 10 a coefficient of interest as a function of the quantity of ammonia gauged by gauging means, of the characteristics of the storage material, of a state variable of the cell and of a state variable of the exterior environment. The state variable of the exterior environment may include the consumption profile of the consumer unit 30, typically the type of driving in the case where the consumer unit 30 is a vehicle.

The method includes a tenth step consisting in comparing in 820 the coefficients of interest to determine the given cell 10 or target cell. The determination of the target cell may thus be carried out after any change of the characteristics of the system, for example after any operation of delivery or filling. The determination of the target cell may also be carried out before the operations of delivery or of filling, from data recorded by the control means 50 and measured data.

Figure 6:
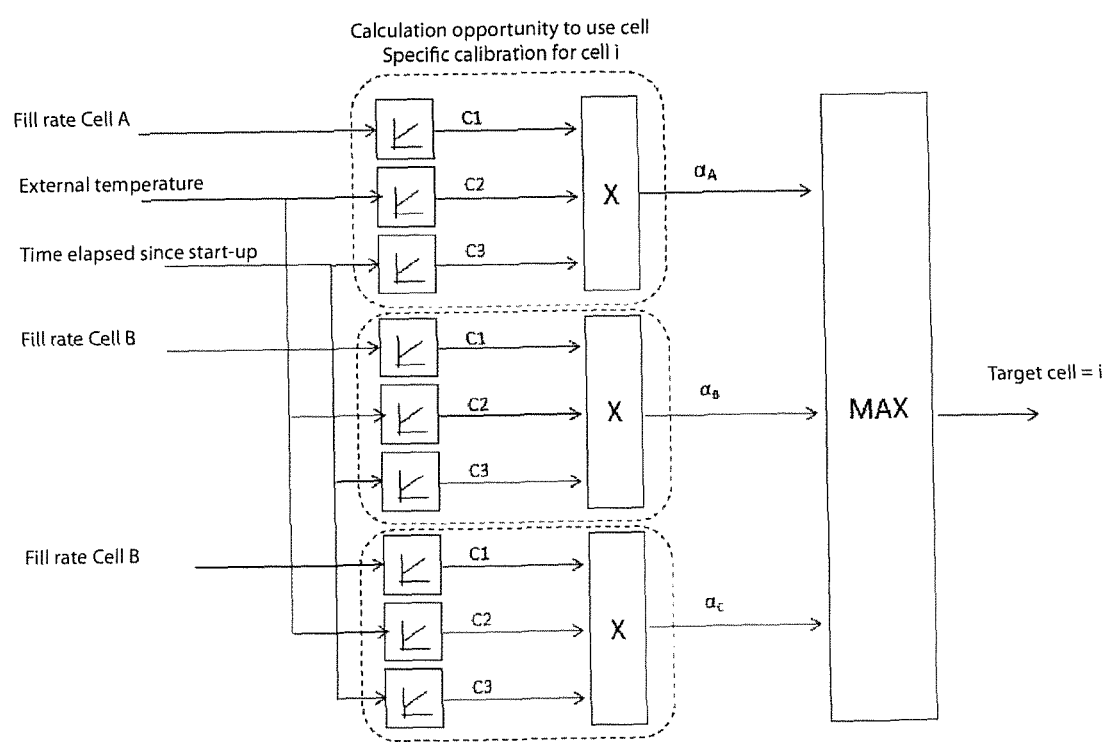
FIG. 6 illustrates schematically a step of determination of a target cell of an example of method according to an embodiment of the invention.

With reference to FIG. 6, an example of implementation of the determination of the target cell is described.

The storage system is here constituted of three independent cells 10 A, B and C, provided with a common outlet interface and separate inlet interfaces. The control means 50 make it possible to manage the heating means 106 of each cell 10 independently.

The three cells 10 contain a composite storage material formed of barium chloride ($BaCl_2$) and an additive of natural expanded graphite type.

The storage material 102 contained in cell A is charged with ammonia to 100% of its maximum capacity.

The storage material 102 contained in cell B is charged with ammonia to 10% of its maximum capacity.

The storage material 102 contained in cell C is formulated so as to have a higher thermal conductivity than the storage material 102 of cells A and B, to the detriment of a lower ammonia density. For example, the storage material 102 of cell C contains a greater quantity of additive, and has a lower compaction rate. The time for bringing into action cell C is thus shorter than for cells A and B. Moreover, the storage material 102 of cell C is charged with ammonia to 30% of its maximum capacity.

At start-up, the supervision means for the control device 50 determine for each cell 10 the $\alpha$ coefficient representing the interest of switching over the operation onto this cell 10. This coefficient is determined for each cell by an algorithm, for example as the product of three factors C1, C2 and C3 depending respectively on the fill rate of the cell 10, on the external temperature, information available in the engine control unit, and on the time that has elapsed since the engine start-up.

For cells A, B and C, C1 corresponds to the fill rate of the cell, and equals <<1>> if the cell is full, and <<0>> if the cell is empty.

For cells A and B, C2 equals <<1>> when the external temperature is higher than 0° C., and C2 equals <<0.2>> when the external temperature is lower than 0° C.

For cell C, C2 equals <<0.2>> when the external temperature is higher than 0° C., and C2 equals <<1>> if the temperature is lower than 0° C.

For cells A, B and C, C3 correspond to the time that has elapsed since the start-up of the engine. C3 equals <<1>> if the elapsed time is lower than 1 h, and C3 equals <<10>> if C1 is lower than <<0.1>> and that the elapsed time is higher than 1 h.

The $\alpha$ coefficient is determined for each cell as the product of these three factors.

In a first case, it is considered that the external temperature equals −15° C. and that the vehicle is at start-up, hence a zero elapsed time. One obtains:

$$\alpha_A = C1*C2*C3 = 0.7*0.2*1 = 0.14$$

$$\alpha_B = C1*C2*C3 = 0.1*0.2*1 = 0.02$$

$$\alpha_C = C1*C2*C3 - 0.3*2*1 = 0.6$$

It is thus cell C that is determined as target cell and heat managed. This is because it corresponds to a storage material 102 having a high thermal conductivity and thus a rapid bringing into action time, a critical parameter in cold conditions.

In a second case, it is considered that the external temperature equals 20° C. and that the vehicle is at start-up, hence a zero elapsed time. One obtains:

$$\alpha_A = C1*C2*C3 = 0.7*1*1 = 0.7$$

$$\alpha_B = C1*C2*C3 = 0.1*1*1 = 0.1$$

$$\alpha_C = C1*C2*C3 = 0.3*0.2*1 = 0.06$$

It is then cell A that is determined as target cell and heat managed. This is because it allows a rapid start-up in normal conditions of use.

In a third case the external temperature is 20° C. and the vehicle has been running for 2 h. One obtains:

$$\alpha_A = C1*C2*C3 = 0.7*1*1 = 0.7$$

$$\alpha_B = C1*C2*C3 = 0.1*1*10 = 1$$

$$\alpha_C = C1*C2*C3 = 0.3*0.2*1 = 0.06$$

It is then cell B that is determined as target cell and heat managed. This is because it here involves favouring the switch over onto a cell 10 virtually empty in conditions where the energy on board is widely available, which is the case for a vehicle running for a sufficiently long time.

In this example, the control means 50 thus make it possible according to the life cases of the storage system to target the cell 10 that is the most advisable to use for an optimised operation of the storage system.

Generally speaking, the method enables an optimised management of the multi-cell storage system, by playing uniquely on the heating means 106 of each cell 10 and using a single means for regulating the flow 20, common to the plurality of cells 10.

Alternatively, or as a complement, the calculation of the coefficients of interest may take into account particular data associated with the cells.

Thus, the coefficient may take into account the fill rate of the cell in order to take into account a shorter gas release time for a cell that is more filled and thus the lowest necessary activation energy.

Moreover, the coefficient may take into account the history of the dosages, that is to say the loadings of the cells and the associated times. This is because a cell having recently functioned will have an internal temperature higher than that of the other cells, and its utilisation thus also makes it possible to minimise the energy required for the release of the stored gas. Furthermore the method may be configured to equal out the number of utilisations of the cells of the system and/or at least the cells of a same assembly or rail during a given period, for example between two maintenances of the system. It involves in particular obtaining a uniform ageing of the cells.

According to a particular embodiment, a cell may not be subjected to a calculation of coefficient initially according to the ninth step, or at least to a different calculation of the other cells.

Such a differentiation makes it possible for example to conserve a full cell as a back-up or as reserve. This cell may only be used when the other cells are all empty or have a fill rate lower than a given value.

It becomes possible to optimise the operation of the storage system, by using at each instant the cell 10 the most adapted to the present conditions of use, making it possible in particular to limit to what is strictly necessary the electrical consumption for the definition of the retained storage system.

According to a particular embodiment, the tenth step may include the selection of a plurality of cells for a simultaneous usage, which may be advantageous in the event of high running speed or high engine load.

It is possible to determine the target cell by taking into account other parameters than those presented in the example. Other factors Ci are then assigned to other parameters. As a non-exhaustive example, it is possible to resort to an estimation of the running conditions, that is to say if the vehicle is for example in town, on the road, or on a motorway. Another parameter that may be envisaged is the distance to travel until the next vehicle maintenance. The principle of calculation of an e coefficient, product of several factors, applies in the same way.

Similarly, this type of supervision means will also be advantageous in the case where all of the cells 10 are identical, in particular to manage in the best way the switch over between cells 10 during their exhaustion in ammonia.

Obviously, the present invention is by no means limited to the forms of embodiment described and represented, and those skilled in the art will know how to make with their general knowledge numerous variants and modifications.

The invention claimed is:

1. System for storing and delivering gaseous ammonia to a consumer unit, the system including:
   a plurality of gaseous ammonia storage cells, each including:
   a storage material that is a gaseous ammonia absorber,
   a means for adjusting an internal pressure of each cell independently of the other cells of the plurality, including a heating means,
   an outlet interface connecting the plurality of cells to the consumer unit, allowing gaseous ammonia to leave each of the cells when the internal pressure is higher than a downstream pressure,
   a control device common to the plurality of cells, allowing independent control of each of the cells of the plurality in delivering ammonia to the outlet interface using a means for controlling the means for adjusting, and
   a common inlet interface including a common inlet channel connecting the plurality of cells, the common inlet channel connectable to a filling means for filling in parallel the cells during a filling operation.

2. System according to claim 1, wherein the outlet interface includes for each cell an outlet valve allowing gaseous ammonia to leave the cell when the internal pressure is higher than a downstream pressure of the outlet valve.

3. System according to claim 2, wherein:
   the system includes a means for regulating the flow of gaseous ammonia towards the consumer unit, the outlet interface connecting the plurality of cells to the means for regulating the flow, and
   the outlet interface includes a common channel, downstream of the outlet valves, connecting the outlet valves of the plurality of cells and the means for regulating the flow, such that the opening of an outlet valve causes the closure of the other outlet valves by pressure difference,
   the control device includes means for controlling the means for regulating the flow.

4. System according to claim 3, wherein the control device includes a pressure sensor in the outlet interface.

5. System according to claim 4, wherein the common control system estimates for each cell its internal pressure as a function of the control of the means for adjusting the pressure of the cell and of a measurement of a parameter chosen from a group including state variables of the cell and the pressure measured by the pressure sensor of the outlet interface.

6. System according to claim 3, wherein the means for regulating the flow is an electrovalve.

7. System according to claim 1, wherein at least one means for adjusting the internal pressure includes a cooling means.

8. System according to claim 1, wherein the storage material of at least one cell is spread out in a plurality of compartments communicating freely between each other.

9. System according to claim 1, wherein the storage material includes a powdered salt of an alkaline-earth metal chloride.

10. System according to claim 1, wherein the common inlet interface includes a passive non-return inlet valve allowing the input of gaseous ammonia into the plurality of cells when the internal pressure is lower than an upstream pressure of the inlet valve.

11. System according to claim 1, including for each cell, an inlet interface connectable to a filling means for filling the cell independently of the other cells, the inlet interface being distinct from the outlet interface.

12. System according to claim 11, wherein the inlet interface includes a passive non-return inlet valve allowing the input of gaseous ammonia into the plurality of cells when the internal pressure is lower than an upstream pressure of the inlet valve.

13. System according to claim 11, wherein each cell can be dismantled independently of the other cells to undergo a filling operation.

14. System according to claim 1, wherein the outlet interface is an inlet interface connectable to a filling means for filling the cell independently of the other cells.

15. System according to claim 14, wherein each cell can be dismantled independently of the other cells to undergo a filling operation.

16. System according to claim 1, in which the cells are arranged in groups, the groups being controlled independently of each other.

17. System according to claim 1, further including at least one rail for collecting ammonia with which the cells of a group are made integral.

18. System according to claim 17, in which the rail and the integrated cells are fixed in a removable manner to the system, so that the rail and the plurality of integrated cells can be dismantled together.

19. System according to claim 17, in which the rail includes the common inlet interface including the common inlet channel connecting the integrated cells.

20. System according to claim 17, in which the rail includes a cavity adapted to receive a heat transfer fluid.

21. Method of delivering gaseous ammonia to a consumer unit by a system for storing and delivering gaseous ammonia, the system including:
a plurality of gaseous ammonia storage cells, each including:
a storage material that is a gaseous ammonia absorber,
a means for adjusting an internal pressure of each cell independently of the other cells of the plurality, including a heating means,
the method comprising:
connecting the plurality of cells to the consumer unit with an outlet interface for allowing gaseous ammonia to leave the cell when the internal pressure is higher than a downstream pressure,
independently controlling the activity of each cell in delivering ammonia to the outlet interface by adjusting the internal pressure of the plurality of cells,
filling in parallel the cells during a filling operation using a common inlet interface including a common inlet channel connecting the plurality of cells.

22. Method according to claim 21, wherein the system includes:
for each cell an outlet valve allowing gaseous ammonia to leave the cell when the internal pressure is higher than a downstream pressure of the outlet valve, a means for regulating the flow of gaseous ammonia towards the consumer unit, the delivery step including the sub-steps of:
transmitting gaseous ammonia from the given cell to a common channel,
downstream of the outlet valves, connecting the outlet valves of the plurality of cells and the means for regulating the flow, while causing the opening of the outlet valve of the given cell by pressure difference between the given cell and the common channel,
causing the closure of the outlet valves of the other cells by pressure difference between the common channel and the other cells,
opening the means for regulating for delivering to the consumer unit the gaseous ammonia transmitted to the common channel.

23. Method according to claim 21, further including the steps of:
carrying out an estimation of an internal pressure of each cell as a function of the control of the means for adjusting the pressure of the cell,
detecting the overrun of a threshold value by the internal pressure of the given cell corresponding to an opening of the outlet valve of the given cell,
after detection of the overrun, carrying out for the given cell an estimation of the internal pressure as a function of a pressure measured at the level of the common channel,
carrying out a gauging by means for gauging the quantity of gaseous ammonia stored by each cell as a function of variations in the measured pressure.

24. Method according to claim 21, further comprising the steps of:
calculating for each cell a coefficient of interest as a function of a quantity of ammonia
gauged by gauging means, of the characteristics of the storage material, of a state variable of the cell and of a state variable of the external environment,
comparing the coefficients of interest to determine the given cell.

25. Method according to claim 24, wherein the calculation of the coefficient is carried out as a function of a history of the utilisations of the cell, so as to take into account a temperature higher than the other cells on account of a recent utilisation, and/or so as to obtain a homogeneous utilisation rate of the cells for a given period.

26. Method according to claim 24, in which a cell is conserved full until all of the other cells have a fill rate lower than a given value.

27. Method according to claim 21, in which the cells are arranged in groups, the groups being controlled independently of each other.

28. System for storing and delivering gaseous ammonia to a consumer unit, the system comprising:
a plurality of gaseous ammonia storage cells, each including:
a storage material that is a gaseous ammonia absorber,
a means for adjusting an internal pressure of each cell independently of the other cells of the plurality, including a heating means, the system further including:
an outlet interface connecting the plurality of cells to the consumer unit, allowing gaseous ammonia to leave each of the cells when the internal pressure is higher than a downstream pressure,
a control device common to the plurality of cells, allowing control, independently of the other cells of the plurality, of the activity of each cell in delivering ammonia to the outlet interface using means for controlling the means of adjusting the internal pressure of the plurality of cells,
wherein each of said cells includes an inlet interface connectable to a filling means for filling the cell independently of the other cells.

29. System for storing and delivering gaseous ammonia to a consumer unit, the system including:
a plurality of gaseous ammonia storage cells, each including:
a storage material that is a gaseous ammonia absorber,
a means for adjusting an internal pressure of each cell independently of the other cells of the plurality, including a heating means,
an outlet interface connecting the plurality of cells to the consumer unit, allowing gaseous ammonia to leave the cell when the internal pressure is higher than a downstream pressure,
a control device common to the plurality of cells, allowing control, independently of the other cells of the plurality, of the activity of each cell in delivering ammonia to the outlet interface using means for controlling the means of adjusting the internal pressure of the plurality of cells, wherein at least one means for adjusting the internal pressure includes a cooling means.

30. Method of delivering gaseous ammonia to a consumer unit by a system for storing and delivering gaseous ammonia, the system including;
a plurality of gaseous ammonia storage cells, each including:
a storage material that is a gaseous ammonia absorber,
a means for adjusting an internal pressure of each cell independently of the other cells of the plurality, including a heating means,
the method comprising the steps of:
determining a given cell among the plurality of storage cells,
controlling the means for adjusting the internal pressure of the plurality of cells, the step including the increase of an internal pressure of the given cell independently of the other cells, to allow gaseous ammonia to leave the cell when the internal pressure is higher than a downstream pressure,
delivering gaseous ammonia from the given cell to the consumer unit independently of the other cells of the plurality via an outlet interface connecting the plurality of cells to the consumer unit,
carrying out an estimation of an internal pressure of each cell as a function of the control of the means for adjusting the pressure of the cell,
detecting the overrun of a threshold value by the internal pressure of the given cell corresponding to an opening of the outlet valve of the given cell,
after detection of the overrun, carrying out for the given cell an estimation of the internal pressure as a function of a pressure measured at the level of the common channel,
carrying out a gauging by means for gauging the quantity of gaseous ammonia stored by each cell as a function of variations in the measured pressure.

31. Method of delivering gaseous ammonia to a consumer unit by a system for storing and delivering gaseous ammonia, the system including;
a plurality of gaseous ammonia storage cells, each including:
a storage material that is a gaseous ammonia absorber,
a means for adjusting an internal pressure of each cell independently of the other cells of the plurality, including a heating means,
the method comprising the steps of:
determining a given cell among the plurality of storage cells,
controlling the means for adjusting the internal pressure of the plurality of cells, the step including the increase of an internal pressure of the given cell independently of the other cells, to allow gaseous ammonia to leave the cell when the internal pressure is higher than a downstream pressure,
delivering gaseous ammonia from the given cell to the consumer unit independently of the other cells of the plurality via an outlet interface connecting the plurality of cells to the consumer unit,
calculating for each cell a coefficient of interest as a function of a quantity of ammonia gauged by gauging means, of the characteristics of the storage material, of a state variable of the cell and of a state variable of the external environment,
comparing the coefficients of interest to determine the given cell.

32. Method of delivering gaseous ammonia to a consumer unit by a system for storing and delivering gaseous ammonia, the system including;
a plurality of gaseous ammonia storage cells, each including:
a storage material that is a gaseous ammonia absorber,
a means for adjusting an internal pressure of each cell independently of the other cells of the plurality, including a heating means,
the method comprising the steps of:
determining a given cell among the plurality of storage cells,
controlling the means for adjusting the internal pressure of the plurality of cells, the step including the increase of an internal pressure of the given cell independently of the other cells, to allow gaseous ammonia to leave the cell when the internal pressure is higher than a downstream pressure,
delivering gaseous ammonia from the given cell to the consumer unit independently of the other cells of the plurality via an outlet interface connecting the plurality of cells to the consumer unit,
in which the cells are arranged in groups, the groups being controlled independently of each other.

33. System for storing and delivering gaseous ammonia to a consumer unit, the system including:
a plurality of gaseous ammonia storage cells, each including:
a storage material that is a gaseous ammonia absorber,
a means for adjusting an internal pressure of each cell independently of the other cells of the plurality, including a heating means,
an outlet interface connecting the plurality of cells to the consumer unit, allowing gaseous ammonia to leave each of the cells when the internal pressure is higher than a downstream pressure,
a control device common to the plurality of cells, allowing independent control of each of the cells of the plurality in delivering ammonia to the outlet interface using a means for controlling the means for adjusting,
wherein at least one means for adjusting the internal pressure includes a cooling means.

34. System according to claim 33, wherein the common inlet interface includes a passive non-return inlet valve allowing the input of gaseous ammonia into the plurality of cells when the internal pressure is lower than an upstream pressure of the inlet valve.

35. System according to claim 33, including, for each cell, an inlet interface connectable to a filling means for filling the cell independently of the other cells, the inlet interface being distinct from the outlet interface.

36. System according to claim 35, wherein the inlet interface includes a passive non-return inlet valve allowing the input of gaseous ammonia into the cell or when the internal pressure is lower than an upstream pressure of the inlet valve.

37. Method of delivering gaseous ammonia to a consumer unit by a system for storing and delivering gaseous ammonia, the system comprising:
a plurality of gaseous ammonia storage cells, each including:
a storage material that is a gaseous ammonia absorber,
a means for adjusting an internal pressure of each cell independently of the other cells of the plurality, including a heating means,
the method comprising the steps of:

determining a given cell among the plurality of storage cells, controlling the means for adjusting the internal pressure of the plurality of cells, the step including the increase of an internal pressure of the given cell independently of the other cells, to allow gaseous ammonia to leave the cell when the internal pressure is higher than a downstream pressure, delivering gaseous ammonia from the given cell to the consumer unit independently of the other cells of the plurality via an outlet interface connecting the plurality of cells to the consumer unit, further including the steps of:

carrying out an estimation of an internal pressure of each cell as a function of the control of the means for adjusting the pressure of the cell, detecting the overrun of a threshold value by the internal pressure of the given cell corresponding to an opening of the outlet valve of the given cell, after detection of the overrun, carrying out for the given cell an estimation of the internal pressure as a function of a pressure measured at the level of the common channel, carrying out a gauging by means for gauging the quantity of gaseous ammonia stored by each cell as a function of variations in the measured pressure.

38. Method of delivering gaseous ammonia to a consumer unit by a system for storing and delivering gaseous ammonia, the system including:

a plurality of gaseous ammonia storage cells, each including:

a storage material that is a gaseous ammonia absorber, a means for adjusting an internal pressure of each cell independently of the other cells of the plurality, including a heating means, the method comprising the steps of:

determining a given cell among the plurality of storage cells, controlling the means for adjusting the internal pressure of the plurality of cells, the step including the increase of an internal pressure of the given cell independently of the other cells, to allow gaseous ammonia to leave the cell when the internal pressure is higher than a downstream pressure, delivering gaseous ammonia from the given cell to the consumer unit independently of the other cells of the plurality via an outlet interface connecting the plurality of cells to the consumer unit, calculating for each cell a coefficient of interest as a function of a quantity of ammonia gauged by gauging means, of the characteristics of the storage material, of a state variable of the cell and of a state variable of the external environment, comparing the coefficients of interest to determine the given cell.

39. Method according to claim 38, wherein the calculation of the coefficient is carried out as a function of a history of the utilisations of the cell, so as to take into account a temperature higher than the other cells on account of a recent utilisation, and/or so as to obtain a homogeneous utilisation rate of the cells for a given period.

* * * * *